INVENTOR.
Charles E. Cloud
Lloyd N. Krohn

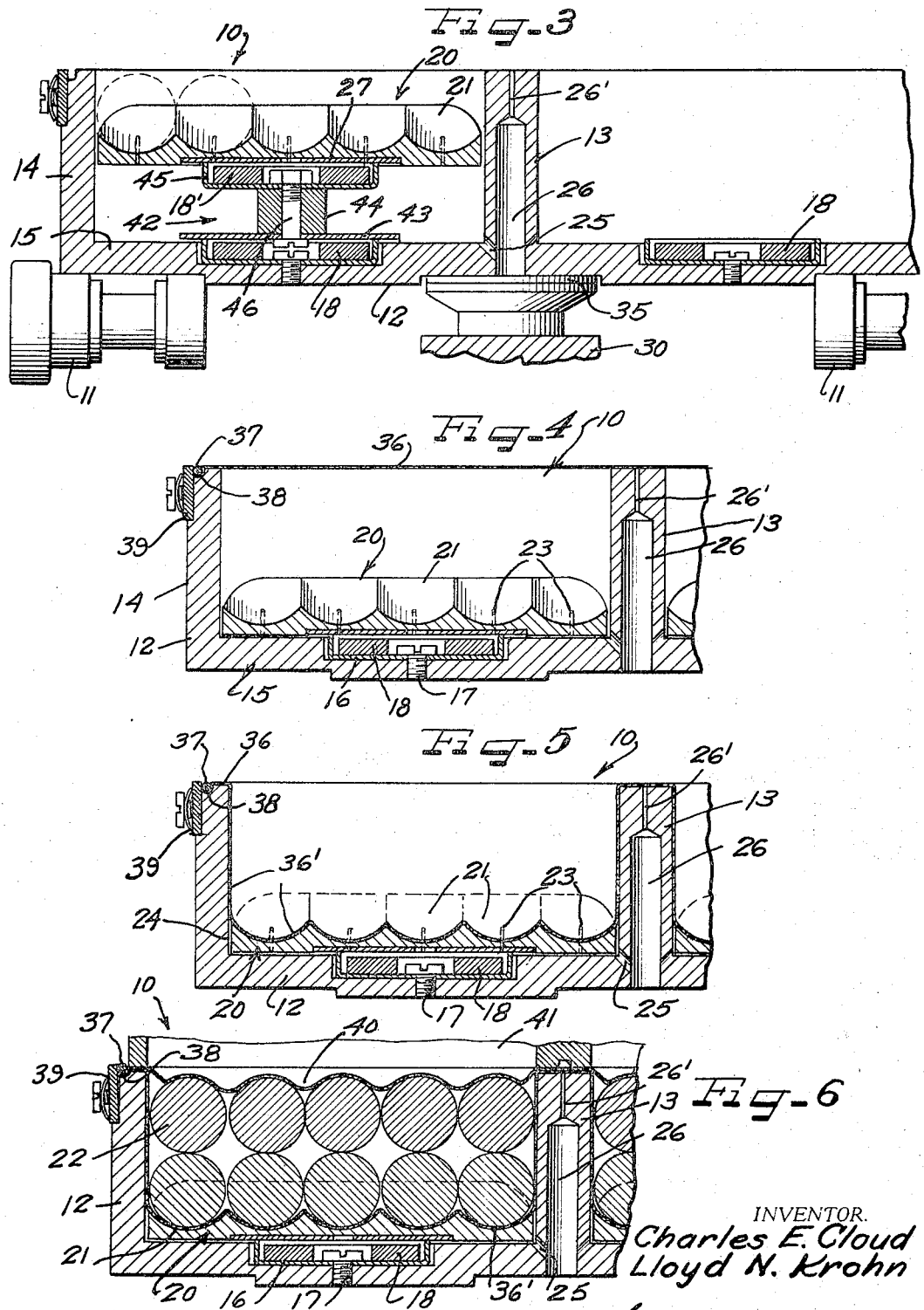

United States Patent Office 3,353,218
Patented Nov. 21, 1967

3,353,218
APPARATUS FOR CHANGING THE SIZE OF PLASTIC FILM CUPPING DIE OF PACKAGING MACHINE
Charles E. Cloud, Wilmette, and Lloyd N. Krohn, Chicago, Ill., assignors to Cloud Machine Corporation, Skokie, Ill., a corporation of Delaware
Filed July 6, 1964, Ser. No. 380,459
13 Claims. (Cl. 18—35)

This invention relates to machines for packaging articles in plastic film or sheeting and more particularly to an apparatus for changing the size of the cupping die in such machines.

Heretofore, in the packaging of articles between sheets of plastic film, it has been the practice to cup one sheet, dispose an article therein and then to apply another sheet thereover. Such cupping dies have usually been carried by a rotating drum or by an endless conveyor chain structure. Illustrations of this general type of packaging machine are to be found in Cloud Patent No. 2,888,787 and in Mehaffy Patent No. 2,935,828.

It has also been the practice to change the size of each cupping die by introducing an insert in the cup which in effect would raise the bottom of the cup so as to reduce the size or thickness of the ensuing packaged unit.

An object of this invention is to provide a very simple form of foolproof mechanism for holding an insert at variable heights in the inside of a packaging machine cupping die.

Another object of the invention is to provide a packaging machine cupping die structure which is exceedingly simple to use and which lends itself to ready cleaning and consequent sanitation.

In accordance with the general features of this invention there is provided in a plastic sheet cupping die structure for a machine for packaging articles, a member for cupping plastic sheet and having a bottom and side walls, a magnetic device at the bottom of the member and an article supporting insert in the member cooperating with the device so as to be detachably held in the member by the magnetic force of the device in a position to receive a portion of a plastic sheet cupped into said member prior to the placing of an article thereon.

Another feature of the invention relates to the provision, as part of the magnetic mechanism for retaining the space in the cupping die, of a spacer between the magnetic device in the cupping die which is magnetically held in place and which also includes a magnetic element for cooperating with the underside of the element whereby the bottom of the die in effect is raised.

Other objects and features of the invention will more fully appear from the following detailed description taken in connection with the accompanying drawings in which:

FIGURE 3 is a fragmentary cross sectional view similar to FIGURE 2 showing a modification wherein a magnetic spacer is shown engaging an insert in the bottom of the cupping die;

FIGURE 4 is a fragmentary cross sectional view corresponding to the left end portion of FIGURE 3 showing the manner in which a plastic sheet is applied over the cupping die;

FIGURE 5 is a fragmentary cross sectional view like FIGURE 4 but showing the plastic film stretched into the cupping die; and FIGURE 6 is a fragmentary cross sectional view corresponding to FIGURE 5 but illustrating articles introduced into the die and a cover film applied over the articles.

As shown in the drawings:

Figure 1:
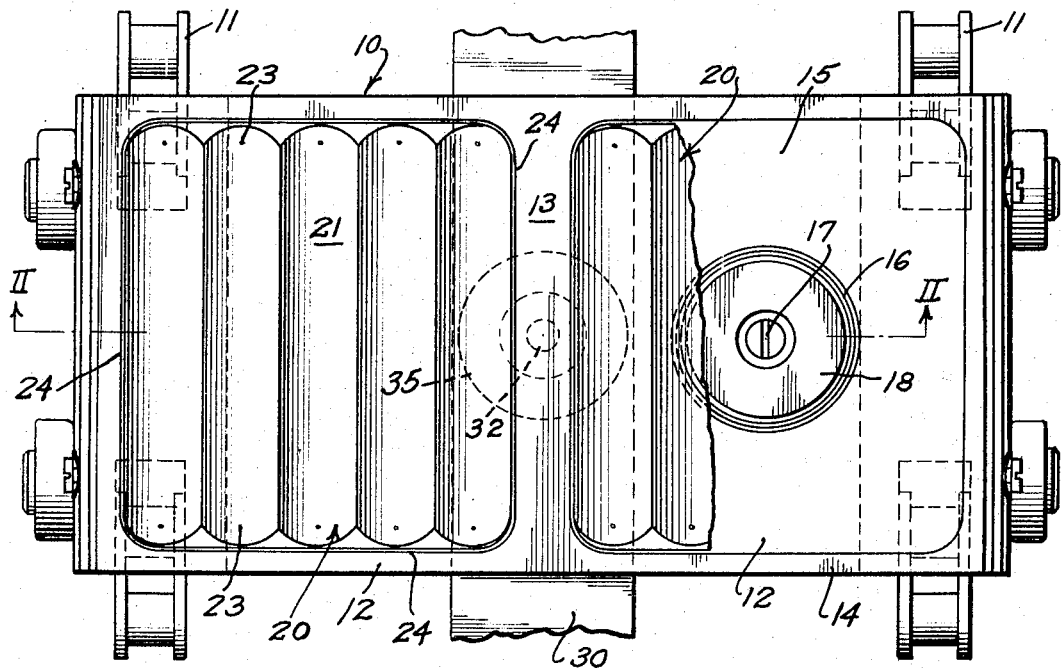
FIGURE 1 is a fragmentary plan view of the upper leg of a conveyor showing our novel cupping structure carried thereby.
Figure 2:
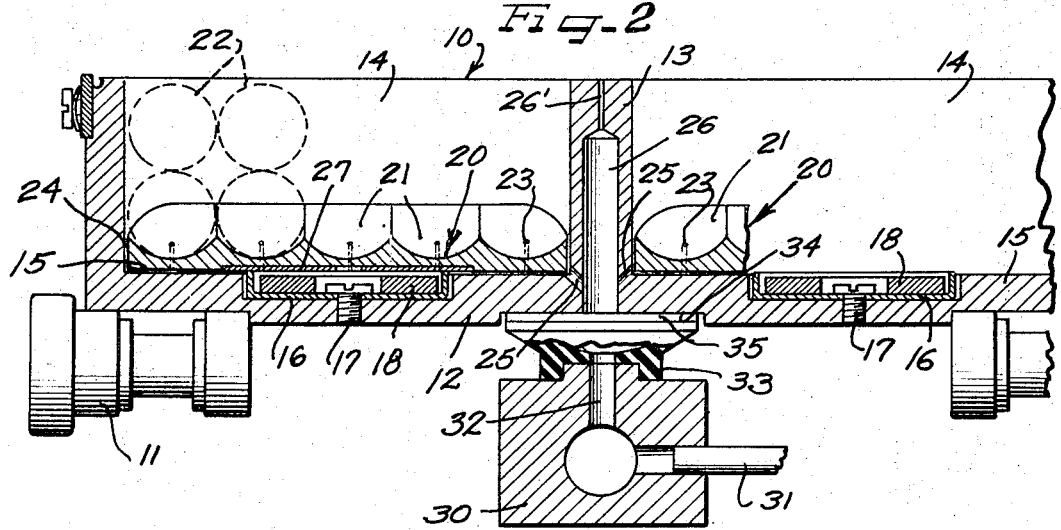
FIGURE 2 is a fragmentary cross sectional view taken on lines II—II of FIGURE 1 looking in the direction indicated by the arrows and showing by dotted lines how articles are received in one of the cups.

At the outset it will be appreciated that only a fragmentary portion of the plastic film packaging machine is as illustrated since our invention is primarily concerned with the cupping die. The reference character 10 designates generally a cupping die structure which extends transversely across conventional conveyor chains 11 and is suitably attached thereto. In the form illustrated, the cupping die structure is embodied in tandem dies 12—12 although it will be appreciated that the invention is not limited to the number of dies employed in the cupping structure 10. The cupping structure 10 may be made of any suitable material although excellent results may be obtained by making same from a light-weight aluminum casting. The cups 12—12 are separated by an intermediate bored wall 13 at the medial plane of the conveyor and each cup is defined by an upstanding wall 14, as well as by a bottom 15 (FIGURES 1 and 2).

It will be further appreciated that a series of cupping structures 10 is secured to both top and lower legs of the conveyor; the number being used depending, of course, on the desired or required length of the conveyor. They are slightly spaced apart so that they can go around the ends of the looped conveyor without binding as is well known in the art.

The bottom 15 of each die 12 is recessed and has inset therein a steel or iron cup 16 detachably held in place by a bolt 17. Secured in this metal cup 16 is a magnetic ring 18 made of any suitable permanent magnetic material. Any suitable number of magnets can be inserted in each cup 12. Also, the magnet may be secured in integrated assembly with an article supporting insert 20 rather than with the cup 16. Such permanent magnets are well known in industry and may be made of sintered ferrite particles fused together with some binder as a ceramic material.

Positioned above the die bottom 15 is the article supporting insert 20 which can be made of any suitable light weight material, such as for example, an aluminum casting. In the form illustrated, the insert has on its top surface a multiple of grooves 21 for accommodating articles to be packaged, such as 22 (shown by dotted lines in FIGURE 2). In other words, the upper surface of the insert 20 is contoured so as to conform to the shape of at least a portion of the article placed thereabove, and as shown, could be frankfurters to be packaged between plastic films. If desired, the insert may be provided with a flat upper surface, depending on the material to be packaged.

The bottom portion of each of the grooves 21 has downwardly extending openings or passageways 23—23. The passageways may be of any suitable number although in the form illustrated (FIGURE 1), they are shown as being two in number, one at each end of the groove 21. These passageways are provided for enabling the application of suction to the upper side of the insert 20 inside the grooves 21.

It will further be perceived that the insert is of an overall size slightly smaller than the opening of the cup or die 12, so that a space 24 is left between the edges of the insert and the vertical wall of the cup clear around the insert. This space in turn communicates with diagonal passageways 25 emanating from central bore 26 in the medial wall 13.

The bottom of each insert 20 has recessed in it a steel disk 27 suitably secured in any manner to the underside of the insert so as to be magnetically attracted to the magnetic ring 18. Where the insert 20 comprises a steel plate, the disk 27 may be omitted. When it is desired to remove the insert 20, this can be effected by manually prying the insert free of the grip of the magnetic element. Such prying can be effected by any suitable tool, such for example, as scissorlike tongs having its opposite ends inserted into the grooved extremities of the insert 21 for gripping edges of the insert and lifting the same off of the magnetic element. This is not only true of the invention shown in FIGURE 2, but also of that of FIGURE 3 to be hereinafter described.

Suction may be applied through the bore 26 and diagonal passageways 25 by any suitable means; it being appreciated that each of the cups can have a series of the diagonal passageways 25 in communication with the bore 26. In FIGURE 2, there is illustrated one form of suction device which comprises a suction box designated generally by a reference character 30.

The suction box 30 has a pipe 31 in communication with any suitable source or supply of suction. This pipe is in turn in communication with the bore 32 in the block aligned generally with the bore 26 in the medial wall of the cupping structure 10.

Secured longitudinally at spaced intervals of the suction box are a series of resilient suction cups 33 with their flexible top surfaces positioned to engage slidably against a recessed flat surface 34 on the bottom side of cup structure 10. Although one cup 33 is shown, it will be understood they are all identical and are supported by longitudinal box 30 extending under the upper leg of the conveyor. These cups 33 may, of course, be of any suitable number. As the conveyor is indexed or moved forwardly, each cup 33 is aligned with a bore 26 of the cupping structure 10. Any suitable means may be employed for fixedly holding the suction box 30 in position with the suction cup 33, in sliding engagement with surface 34.

The suction cup 33 may be made of any suitable rubber or plastic-like material; and each may have a ring or washer or protective cover 35 over the open end of the cup to reduce the wear and tear on the edges of the cup. This cover may be made of any suitable low friction type material such as "Insurok" or "Teflon." All of this suction box structure is the subject of the co-pending application, it being understood that any other suitable suction means, as far as this invention is concerned, can be employed to provide suction in the diagonal passageways 25 in the bottoms of the cups. While in the illustrated form a suction box is provided for drawing the film into the cup 16, any suitable means such as fluid pressure, above atmospheric pressure, may be used to create a pressure differential across the film being displaced into the cup 16 to effect such displacement of the plastic material.

We shall now proceed to describe the packaging of articles in the cupping structure and as best exemplified by FIGURES 4, 5 and 6. As the conveyor is moved forwardly a sheet of heat sealable and stretchable plastic film 36 is suitably applied over the tops of the dies of each cup structure 10. The edges of this sheet may be clamped in any suitable manner to the opposite edges of the cup structure 10. One such structure comprises a pair of gripping belts 37 one on each of the opposite edges of the cup structure 10. Each of these belts 37 may be of any suitable structure, preferably take the form of a plurality of spring steel convolutions like in a steel coil spring. The tautness of the belt forces the margin of the plastic sheet 36 into a grooved edge 38 of the cup structure 10. Attached to each side of the cup structure 10 is a spring urged plate 39 for holding the belt in the groove with the edge of the plastic sheet firmly in place. While only one belt is shown, it will be appreciated that the same structure is used for each of the two dies 12 that make up the cup structure 10 carried by the conveyor chains 11—11.

In addition, if it is so desired, the central bore 26 may have a reduced section 26' communicating with the medial portion of the plastic to assist in holding it on the cup structure 10.

Now referring to FIGURE 5 it will be noted that when suction is applied to bore 26, passageways 25 and insert passageways 23, the central portion 36' of the plastic sheet 36 is drawn or sucked down into the interior of the die 12 and snugly into the respective grooves 21 of the insert 20. Any suitable or conventional heat means may be employed for the plastic sheet so as to make it stretchable into the cup die. The plastic which is used, may be of a type well known in the industry and commonly known as a stretch-wrap type of plastic.

Thereafter, as shown in FIGURE 6, rows of articles 22 are disposed in each die or cup. In this instance, two rows of such articles 22 are inserted with one row superimposed on the other. Thereafter, another heat sealable plastic film sheet 40 is applied over the top of the cup or die. The sheet 40 is sealed at its margin to the other sheet except a seal opening is left in the sealed area for evacuation.

A suction and sealing head 41, of any suitable or conventional structure, can then be disposed over the dies for evacuating each package in each cup and for causing the cover film 40 to be pulled down tightly against the upper rows of articles 22. This head 41, as is well known in the art, may also include means for heat sealing the margins of the plastic films together around the die after which each sealed section can be suitably cut from the sheet material.

In FIGURE 3, there is illustrated a modification wherein a magnetic spacer 42 comprises part of the magnetic device. This spacer 42 serves the dual purpose of elevating the article supporting insert 20 and of also magnetically attaching that insert to the bottom of the die or cup. In both forms of the invention, magnetic means serve to hold the insert in place even when the cups or dies are turned upside down as they travel on the underside of the conveyor belt. It will further be appreciated that the magnetic means may coact with the side walls of the die cups 16 rather than with the bottoms of the die cups in accordance with the principles of this invention.

All of the structure shown in FIGURE 3 is identical to that shown in the first form with the exception of the spacer between the magnetic ring 18 and the metal plate 27 in the underside of the insert 20.

The spacer 42 includes a bottom steel plate 43 adapted to be magnetically gripped by the magnetic ring 18. Plate 43 is attached to a metal sleeve 44 which in turn carries a steel cup 45 in which is disposed and secured a magnetic ring 18'. Like ring 18, this ring 18' is positioned to grip steel plate 27 in the bottom of the insert 20. A bolt assembly 46 is used to secure the cup 45 to the plate 43.

When the spacer 42 is used, it raises insert 20 in the die or cup 12 consistent with the desired thickness of the ultimate package. For example, in this instance, the package comprises two rows of articles such as frankfurters but otherwise the structure and packaging is identical to that described previously in connection with the first form.

It will further be noted that, in the forms of both FIGURES 2 and 3, the permanent magnetic ring 18–18' is slightly spaced vertically from the cooperating magnetic plate 27–43 so as to provide an air gap for augmenting the gripping power of the magnet.

From the foregoing it is clear that this method is a very simple and inexpensive structure for holding an article supporting inserts in cupping dies. The structure is such that it lends itself to easy removal for cleaning and consequent sanitation.

Although minor modifications might be suggested by those versed in the art, it should be understood that we wish to embody within the scope of the patent warranted hereon, all such modifications as reasonably and properly come within the scope of our contribution to the art.

We claim as our invention:

1. In a plastic sheet cupping die structure for a machine for packaging articles,
   a member for cupping plastic sheet and having a bottom and side walls,
   a permanent magnetic device at the bottom of said member and an article supporting magnetically responsive insert in said member cooperating with said device so as to be detachably held in said member by the magnetic force of said device in a position to receive a portion of a plastic sheet cupped into said member prior to the placing of an article thereon.

2. In a plastic sheet cupping die structure for a machine for packaging articles,
   a member for cupping plastic sheet and having a bottom and side walls,
   a permanent magnetic device at the bottom of said member and an article supporting magnetically responsive insert in said member cooperating with said device so as to be detachably held in said member by the magnetic force of said device in a position to receive a portion of a plastic sheet cupped into said member prior to the placing of an article thereon,
   said insert having its upper surface contoured to shape at least a portion of the cupped sheet to conform to the shape of at least a portion of the article placed thereon.

3. In a plastic sheet cupping die structure for a machine for packaging articles,
   a member for cupping plastic sheet and having a bottom and side walls,
   a permanent magnetic device at the bottom of said member and an article supporting magnetically responsive insert in said member cooperating with said device so as to be detachably held in said member by the magnetic force of said device in a position to receive a portion of a plastic sheet cupped into said member prior to the placing of an article thereon,
   said insert being provided with at least one passageway extending therethrough for communication with a source of suction to cup the plastic sheet into said cupping member.

4. In a plastic sheet cupping die structure for a machine for packaging articles,
   a member for cupping plastic sheet and having a bottom and side walls,
   a permanent magnetic device at the bottom of said member and an article supporting magnetically responsive insert in said member cooperating with said device so as to be detachably held in said member by the magnetic force of said device in a position to receive a portion of a plastic sheet cupped into said member prior to the placing of an article thereon,
   said insert being grooved to conform to the shape of at least a portion of an article being packaged for corresponding shaping at least a portion of the plastic sheet being cupped prior to the placing of an article thereon.

5. In a plastic sheet cupping die structure for a machine for packaging articles,
   a member for cupping plastic sheet and having a bottom and side walls,
   a magnetic device at the bottom of said member, and an article supporting magnetically responsive insert in said member cooperating with said device so as to be detachably held in said member by the magnetic force of said device in a position to receive a portion of a plastic sheet cupped into said member prior to the placing of an article thereon,
   said device including a spacer between the bottom of the cupping member and said insert magnetically held in place and including a magnet for gripping the underside of said insert,
   said spacer serving to raise the insert in the cupping member to lessen the extent of cupping and the consequent thickness of the ensuing packaged article.

6. In a machine for packing articles between plastic film sheeting,
   a dished cupping die having a permanent magnetic device in the bottom thereof,
   an article supporting magnetically responsive insert in said die over said device and held in place in the die by the magnetic force of said device,
   said die having spaced edges for supporting a sheet of plastic extending across the top of the die and the insert therein, and
   means for subjecting the sheet to a pressure differential for drawing a major portion of the sheet down into the interior of the die and into contact with said insert preparatory to having an article to be packaged placed thereon.

7. In a machine for packing articles between plastic film sheeting,
   a dished cupping die having a magnetic device in the bottom thereof,
   an article supporting magnetically responsive insert in said die over said device and held in place in the die by the magnetic force of said device,
   said die having spaced edges for supporting a sheet of plastic extending across the top of the die and the insert therein,
   said magnetic device including a spacer for maintaining the insert over the cup bottom to a predetermined position consistent with the thickness of the desired package, and
   means subjecting the sheet to a pressure differential for drawing a major portion of the sheet down into the interior of the die into contact with said insert preparatory to having an article to be packaged placed thereon.

8. In a plastic sheet cupping die structure for a packaging machine.
   a cupping die having at least one suction passageway in communication with the interior of the bottom thereof,
   an article supporting and plastic sheet shaping magnetically responsive insert in said die formed so its top surface is in communication with said passageway for the supplying of suction thereto, and
   an attachment in the die between the bottom thereof and the underside of said insert for detachably retaining the insert in the die but from which the insert can be manually pried free when it is desired to remove the insert,
   said attachment including a permanent magnet for magnetically attaching the insert to the bottom of the cupping die.

9. In a plastic sheet cupping die structure for a machine for packaging articles,
   a member for cupping plastic sheet and having a bottom and side walls,
   a permanent magnetic device at the bottom of said member,
   an article supporting magnetically responsive insert in said member, and
   a magnetic device engageable between said member and said article supporting insert for detachably holding the insert in position to receive a portion of a plastic sheet cupped into said member prior to the placement of an article thereon.

10. In a packaging machine for sealing product in thermoplastic films including an endless conveyor, the improvement of
   a series of cupping dies provided on the conveyor and movable therewith,
   the dished cupping dies having magnetic devices in the bottoms thereof,
   article supporting magnetically responsive inserts in said dies over said devices and held in place in the dies by the magnetic force of said devices,
   said dies having spaced edges for supporting a sheet of plastic extending across the top of the dies and the inserts therein,
   said magnetic devices including spacers for maintaining the inserts over the cup bottoms to a predetermined position consistent with the thickness of the desired package, and
   means subjecting the sheet to a pressure differential for drawing a major portion of the sheet down into the interior of the dies into contact with said inserts preparatory to having an article to be packaged placed thereon.

11. The packaging machine of claim 10 further characterized by being provided with means including a pair of belts at the margins of the dies each taking the form of a plurality of spring steel convolutions like a steel coil spring for holding the sheet of plastic on the dies.

12. The machine of claim 11 further characterized by said dies having grooves at opposite margins with said belts therein and biased means for holding the belts in the grooves enabling opposite edges of the plastic sheet to be secured firmly in place.

13. In a packaging machine for sealing product in thermoplastic films including an endless conveyor, the improvement of
   a series of cupping dies provided on the conveyor and movable therewith,
   the dished cupping dies having magnetic devices in the bottoms thereof,
   article supporting magnetically responsive inserts in said dies over said devices and held in place in the dies by the magnetic force of said devices,
   said dies having spaced edges for supporting a sheet of plastic extending across the top of the dies and the inserts therein, and
   means subjecting the sheet to a pressure differential for drawing a major portion of the sheet down into the interior of the dies into contact with said inserts preparatory to having an article to be packaged placed thereon.

References Cited

UNITED STATES PATENTS

| | | | |
|---|---|---|---|
| 2,321,570 | 6/1943 | Billings. | |
| 2,458,970 | 1/1949 | Wilson | 248—206 |
| 2,581,489 | 1/1952 | Kilham. | |
| 2,666,352 | 1/1954 | Philips | 248—206 |
| 2,808,621 | 10/1957 | Torrey | 18—44 |
| 2,813,710 | 11/1957 | Angle | 248—206 |
| 2,825,177 | 3/1958 | Nordlof et al. | 248—206 |
| 2,907,992 | 10/1959 | Bronikowski | 248—206 |
| 3,216,832 | 11/1965 | King | 53—22 |
| 3,218,776 | 11/1965 | Cloud | 53—30 |

ROBERT C. RIORDON, *Primary Examiner.*

N. ABRAMS, *Examiner.*